(12) United States Patent  (10) Patent No.: US 7,771,867 B2
Kohri et al.  (45) Date of Patent: Aug. 10, 2010

(54) BATTERY ACCOMMODATING STRUCTURE AND MOBILE TERMINAL

(75) Inventors: Katsushige Kohri, Hyogo (JP); Yoshiya Matsumoto, Kawasaki (JP); Kouji Hirata, Hyogo (JP); Yoshito Fukata, Hyogo (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 948 days.

(21) Appl. No.: 10/852,106

(22) Filed: May 25, 2004

(65) Prior Publication Data

US 2004/0253507 A1 Dec. 16, 2004

(30) Foreign Application Priority Data

Jun. 13, 2003 (JP) .............................. 2003-169333

(51) Int. Cl.
*H01M 2/10* (2006.01)
(52) U.S. Cl. ......................................... 429/96; 429/100
(58) Field of Classification Search .................. 429/96, 429/100
See application file for complete search history.

(56) References Cited

U.S. PATENT DOCUMENTS 4,578,628 A * 3/1986 Siwiak ........................ 320/127
5,819,163 A * 10/1998 Tsukamoto et al. ......... 455/575.1
6,293,819 B1 * 9/2001 Wu ............................. 439/500
6,373,693 B1 * 4/2002 Seto et al. .................... 361/685
6,633,483 B2 10/2003 Akagi et al. ................. 361/686
2002/0064023 A1 5/2002 Akagi et al. ................. 361/686
2003/0181226 A1 9/2003 Kawata et al. ............... 455/572

FOREIGN PATENT DOCUMENTS

| JP | 63-302650 | 12/1988 |
| JP | 10-32625 | 2/1998 |
| JP | 2001-85864 | 3/2001 |
| JP | 2001-189785 | 7/2001 |
| JP | 2002-056831 | 2/2002 |
| JP | 2002-164120 | 6/2002 |
| JP | 2002-204286 | 7/2002 |
| JP | 2002-287853 | 10/2002 |

OTHER PUBLICATIONS

Machine translation of JP 2001-85864.*

* cited by examiner

*Primary Examiner*—Patrick Ryan
*Assistant Examiner*—Julian Mercado
(74) *Attorney, Agent, or Firm*—Kratz, Quintos & Hanson, LLP

(57) ABSTRACT

In a battery accommodating structure having a battery chamber in which a battery is inserted and having a rear cover that covers the battery chamber in which the battery has been inserted, at least one screwing portion of screwing portions where two plate-like members are screwed to each other is disposed at a position where at least one of screwing portions is concealed by inserting the battery in the battery chamber on a bottom portion of the battery chamber.

2 Claims, 5 Drawing Sheets

BATTERY ACCOMMODATING STRUCTURE AND MOBILE TERMINAL

BACKGROUND OF THE INVENTION

1. Field of the Invention

The present invention relates to a battery accommodating structure in an device or equipment having a battery chamber in which a battery is accommodated and a mobile terminal that performs communication with an external device or equipment by power supplied from a battery accommodated in a battery chamber.

2. Description of the Related Art

Conventionally, a mobile terminal such as, for example, a mobile telephone, or each of devices used over various fields has a battery chamber and is constituted so as to operate due to power from a battery inserted in the battery chamber.

These devices include a device that is required to be made thinner, such as being typified by, for example, a mobile telephone. In such a device, a battery accommodating structure is preferably adopted that it has two plate-like members superimposed to each other, one plate-like member has a battery chamber accommodating a battery therein and has a battery cover closing the battery chamber, and the two plate-like members are screwed to each other (for example, refer to Japanese Patent Nos. 2001-85864A and 63-362650A (JP)).

In the mobile telephone, for example, such a structure where a battery back face accommodated in a battery chamber is utilized as a portion of an external shape of the mobile telephone may be adopted, as shown in JP2001-85864A. In the case, there is such a problem that it is necessary to prepare different kinds of batteries or batteries having different colors corresponding to kinds of mobile phones or different colors of mobile phones even if the mobile phones are ones of the same type, which results in remarkable increase in cost of a battery.

In order to solve the problem, such a structure that a battery cover closing a battery chamber is provided as another member separate from a battery inserted in the battery chamber has been proposed in JP63-362650A, for example.

In such a structure provided with a battery lid or cover independent from a battery, a problem arises about portions of the two plate-like members where screwing is conducted.

JP63-362650A shows a structure that a screwing portion is disposed on a battery chamber bottom portion, but does not show a battery or a battery lid. Therefore, a positional relationship between the screwing portion and the battery or the battery lid is unclear in JP63-362650A.

FIG. 4 is a view showing a back face of a portion of a conventional mobile phone, a battery inserted in a battery chamber provided on the back face, and a rear cover closing the battery chamber.

Various parts are disposed on a back face of the mobile phone shown in Part (A) of FIG. 4 such that a medium mounting section 14 on which a recording medium is mounted is provided on a bottom of a battery chamber 11. A screwing structure will be herein explained.

The battery chamber 11 is formed on the back face of the mobile phone shown in Part (A) of FIG. 4, a battery 20 shown in part (C) of FIG. 4 is inserted in the battery chamber 11, and a rear cover 30 is further attached from above the battery 20.

Places where screwing portions 12 are to be provided are four places of two places on a battery chamber bottom portion and two places positioned under and covered with screw caps 13 as a whole.

FIG. 5 is a view showing a state that a battery has been inserted in the battery chamber of the mobile phone shown in FIG. 4 and a rear cover before mounted.

A rear cover 30 is mounted so as to cover the battery chamber by putting the rear cover 30 to slide the same in the direction of arrow X, after the battery 20 is inserted in the battery chamber.

As shown in FIG. 5, in a conventional example shown here, screwing portions 12 provided on two positions on the battery chamber bottom portion are formed at positions projecting from the battery 20 inserted in the battery chamber.

Accordingly, for example, for conducting repair or the like, the mobile phone can be disassembled by removing screws at the screwing portions 12 without removing the battery 20 from the battery chamber.

In the case, power from the battery 20 continues to be supplied to an internal circuit. Therefore, there is a fear that, when a mobile phone user touches an internal part(s) carelessly, short-circuiting is caused so that even a circuit section operating regularly is destroyed.

In view of these circumstances, an object of the present invention is to provide a battery accommodating structure and a mobile terminal where safety at a disassembling time has been considered.

SUMMARY OF THE INVENTION

According to an aspect of the present invention, in order to solve the problem, there is provided a battery accommodating structure having two superimposed plate-like members, where one of the plate-like members has a battery chamber accommodating a battery and has a battery cover closing the battery chamber, and the two plate-like members are screwed to each other from the side of the one plate-like member having the battery chamber, wherein at least one of screwing portions through which the two plate-like members are screwed to each other is disposed at a position where the at least one of screwing portions is concealed by inserting the battery in the battery chamber on a bottom portion of the battery chamber.

In the battery accommodating structure of this aspect, since at least one of screwing portions through which two plate-like members are screwed is disposed at a position where the at least one of screwing portions is concealed by inserting a battery in the battery chamber on a bottom portion of the battery chamber, when a mobile terminal having this battery accommodating structure is disassembled, the battery needs to be detached from the battery chamber, so that the disassembling is performed always with the battery removed. Accordingly, failure such as short-circuiting is prevented from occurring.

In the battery accommodating structure of this aspect, a medium mounting section in which a recording medium is mounted may be provided on the bottom portion of the battery chamber.

According to the battery accommodating structure of this aspect, since short-circuiting is prevented during disassembling of the mobile terminal, even if the mobile terminal is disassembled with the recording medium mounted in the medium mounting section, such a trouble that important information stored in the recording medium is destroyed due to short-circuiting can be prevented.

According to another aspect of the invention, in order to solve the problem, there is provided a mobile terminal that is inserted with a battery to perform communication with an external device by power supplied from the battery, comprising two superimposed plate-like members, one of the plate-like members having a battery chamber in which a battery is accommodated and the two plate-like members are screwed to each other from the side of the one plate-like member, wherein at least one of screwing portions through which the two plate-like members are screwed is disposed at a position wherein the at least one of screwing portions is concealed by inserting the battery in the battery chamber on a bottom portion of the battery chamber.

Such a structure having two superimposed plate-like members where short-circuiting is prevented at a time of disassembling a device or equipment are suitable for a mobile terminal, particularly a mobile phone.

According to the present invention, short-circuiting of a circuit that may occur during disassembling can be prevented effectively.

DESCRIPTION OF THE PREFERRED EMBODIMENT

An embodiment of the present invention will be explained below with reference to the drawings.

Figure 1:
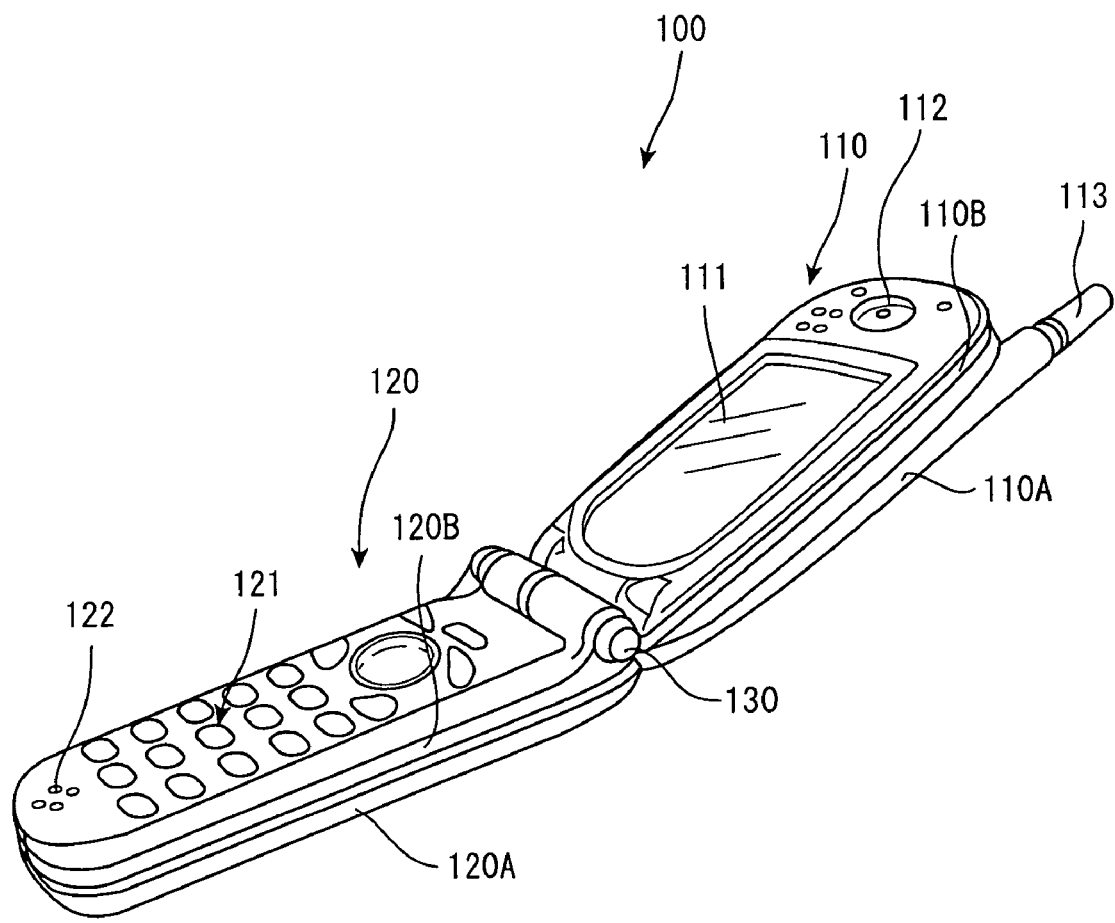
FIG. 1 is a perspective appearance view of a mobile phone, that is one embodiment of a mobile terminal of the present invention, having a battery accommodating structure as one embodiment of the present invention.

FIG. 1 is a perspective appearance view of a mobile phone, that is one embodiment of a mobile terminal of the present invention, having a battery accommodating structure as one embodiment of the present invention.

A mobile phone 100 is a mobile phone of a folding type where an upper portion 110 assembled with a display screen 111, an earpiece 112, an antenna 113 and the like, and a lower portion 120 formed with a key operation panel 121, a mouthpiece 122 and the like are connected to each other via hinge 130 in an openable/closable manner. The upper portion 110 of the mobile phone 100 has a structure obtained by superimposing a front face side plate-like member 110B on a rear face side plate-like member 110A, and the two plate-like members 110A and 110B are fixed to each other by screwing. Similarly, the lower portion 120 of the mobile phone 100 has a structure obtained by superimposing a front face side plate-like member 120B on a rear face side plate-like member 120A, and the two plate-like members 120A and 120B are fixed to each other by screwing. A circuit board (not shown), on which circuit parts receiving power from a battery (described later) to operate are mounted is provided at a position or a space defined between the two plate-like members 120A and 120B.

Figure 2:
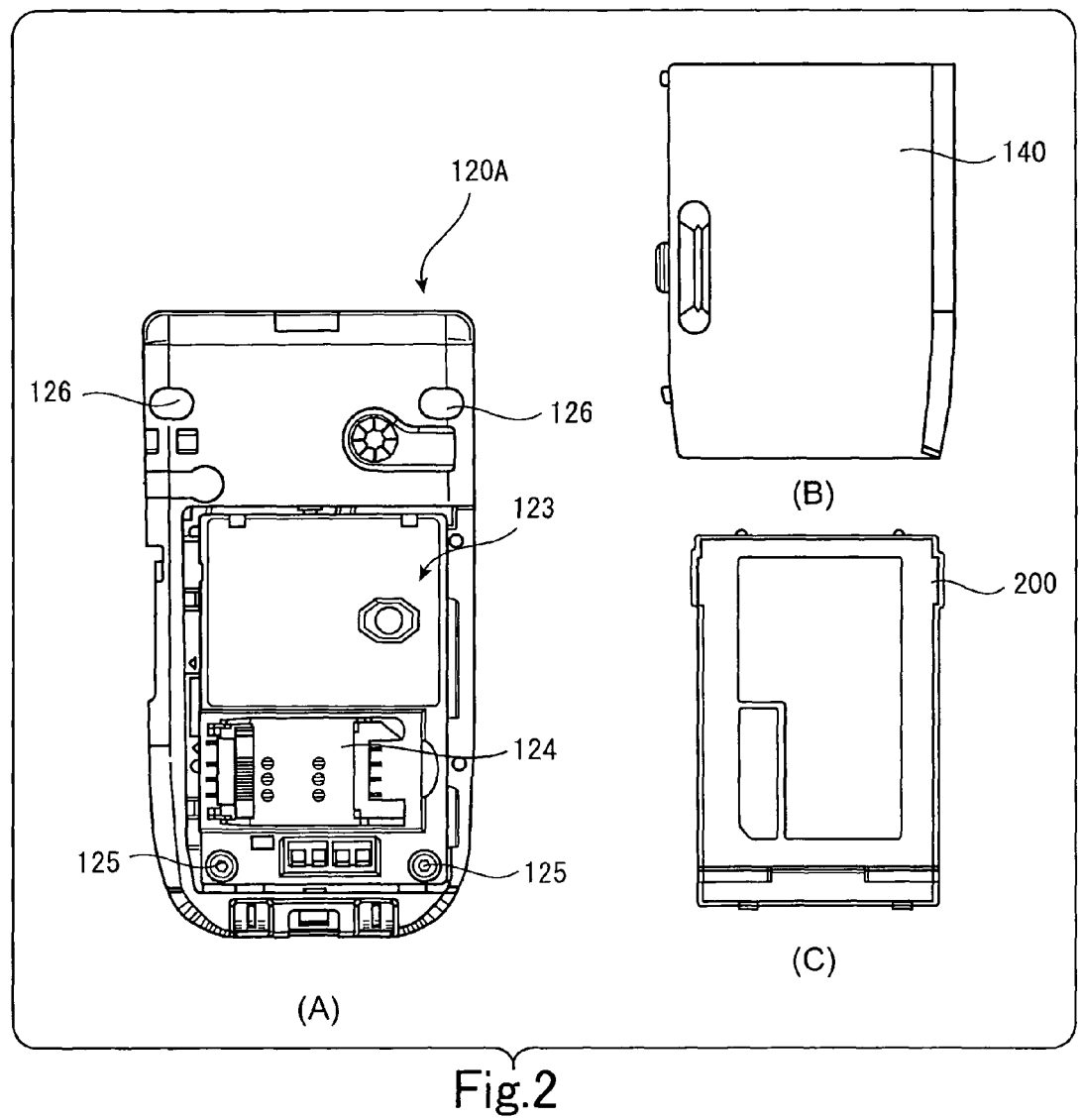
FIG. 2 is a view showing a rear face of a rear face side plate-like member constituting a lower portion of the mobile phone shown in FIG. 1, a battery inserted in a battery chamber provided on the rear face, and a rear cover covering the battery chamber.

FIG. 2 is a view showing a rear face of a rear face side plate-like member constituting a lower portion 120 of the mobile phone 100 shown in FIG. 1, a battery inserted in a battery chamber provided on the rear face, and a rear cover covering the battery chamber.

Various parts are arranged on a rear face of the rear face side plate-like member 120A shown in Part (A) of FIG. 2 such that a mounting section 124 where a recording medium is mounted is provided on a bottom portion of a battery chamber 123. However, detailed explanation of these parts will be omitted and a screwing structure which is a feature of the present invention will be explained herein.

The rear face of the plate-like member 120A constituting the mobile phone, which is shown in Part (A) of FIG. 2, is formed with the battery chamber 123, a battery 200 shown in Part (C) of FIG. 2 is inserted in the battery chamber 123, and a rear cover 140 shown in Part (B) of FIG. 2 is further fitted from above the battery 200.

The rear face side plate-like member 120A and the front face side plate-like member 120B of the lower portion 120 of the mobile phone 100 shown in FIG. 1 are fixed to each other by screwing from the side of the rear face side plate-like member 120A in such a state that a board has been sandwiched between the plate-like members 120A and 120B.

Screwing portions 125 where the plate-like members 120A and 120B are screwed exist at four places, including two places on the bottom portion of the battery chamber 123 and the other two places positioned under and covered with screw caps 126 as a whole.

Figure 3:
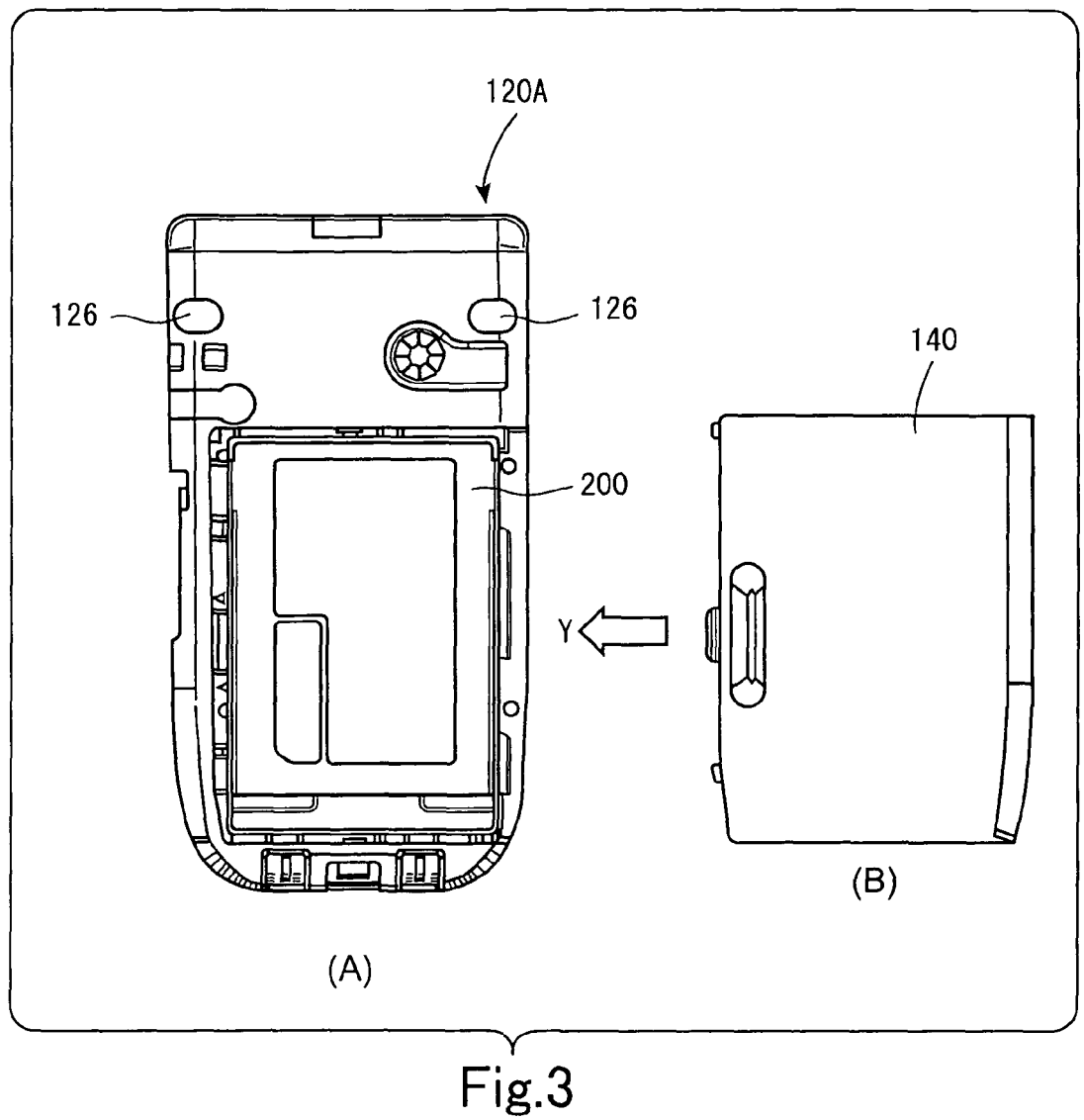
FIG. 3 is a view showing a rear face of the rear face side plate-like member in a state where a battery has been inserted in the battery chamber and the rear cover before mounted.
Figure 4:
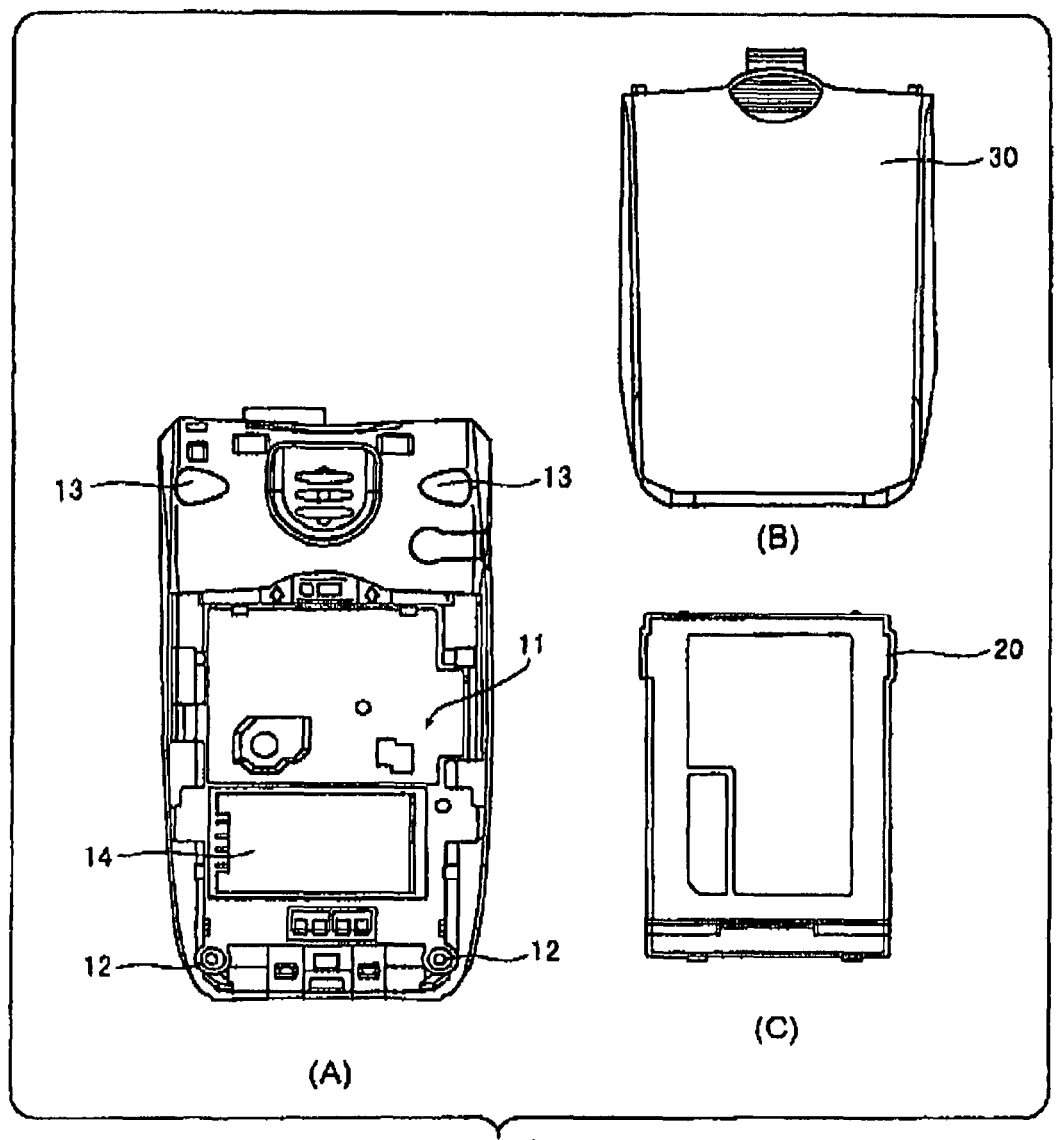
FIG. 4 is a view showing a rear face of one portion of a conventional mobile phone, a battery inserted in a battery chamber provided in the rear face, and a rear cover closing the battery chamber.
Figure 5:
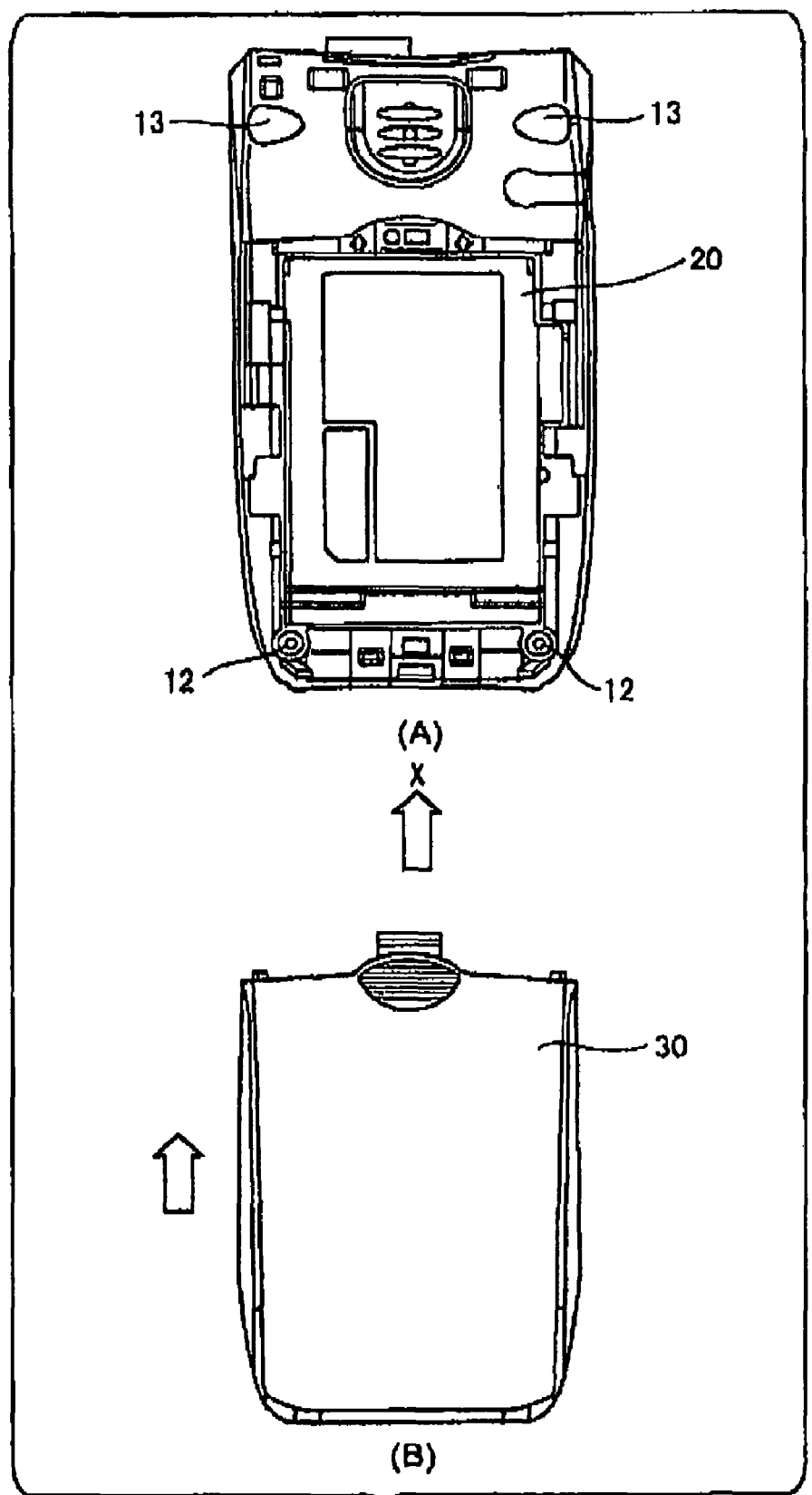
FIG. 5 is a view showing a state that a battery has been inserted in the battery chamber of the mobile phone shown in FIG. 4 and the rear cover that is mounted.

FIG. 3 is a view showing a rear face of the rear face side plate-like member in a state where a battery has been inserted in the battery chamber and the rear cover before mounted.

As is understood from a comparison of Part (A) of FIG. 2 and Part (A) of FIG. 3, screwing portions 125 are provided at positions where they are concealed under the battery 200 by inserting the battery 200 in the battery chamber 123. Therefore, in order to disassemble the two plate-like members 120A and 120B of the lower portion 120 of the mobile phone 100 shown in FIG. 1, it is insufficient to remove the rear cover 140 merely and it is necessary to detach the battery 200 itself from the battery chamber 123. Accordingly, before the two plate-like members 120A and 120B are disassembled, the battery 200 has been removed necessarily so that careless short-circuiting is prevented and data destroy of the recording medium mounted in the mounting section 124 due to the short-circuiting is also prevented.

The rear cover 140 can be mounted so as to close the battery chamber by putting the rear cover 140 on the battery chamber inserted with the battery 200 and sliding the same in a direction of arrow Y shown in FIG. 3.

Though the mobile phone has been herein explained as the embodiment, it is not that the present invention is applicable only to the mobile phone. For example, the present invention is applicable to any mobile terminal that is inserted with a battery and has a function that performs communication with an external device or equipment by power from the battery. More broadly, the present invention can be applied to any equipment having a structure where two plate-like members are screwed to each other in a superimposed manner and that operates by power of a battery inserted in the equipment.

What is claimed is:

1. A mobile terminal comprising:
   a front plate member that covers a front of the mobile terminal and a rear plate member that covers a back of the mobile terminal, the rear plate member having a battery chamber in which a battery is accommodated,
   the front plate member and the rear plate member being screwed together by screws inserted in a direction from the rear plate member to the front plate member, the front plate member and the rear plate member having screwing portions into which the screws are inserted, and at least one of the screwing portions is formed on a bottom surface of the battery chamber so that the at least one of the screwing portions is concealed by the battery when the battery is inserted in the battery chamber; and a rear cover that covers the battery when the battery is inserted in the battery chamber, wherein the rear cover covers, in cooperation with the rear plate member, an entire surface of the battery accomodated in the battery chamber.

2. A battery accommodating structure according to claim 1, wherein the bottom portion of the battery chamber is provided with a medium mounting section in which a recording medium is mounted.

* * * * *